United States Patent [19]

Law

[11] Patent Number: 4,468,535
[45] Date of Patent: Aug. 28, 1984

[54] SNAP-ON LIQUID TIGHT CONNECTOR FOR FLEXIBLE METAL CONDUIT

[75] Inventor: Joseph P. Law, Scotch Plains, N.J.
[73] Assignee: Thomas & Betts Corporation, Raritan, N.J.
[21] Appl. No.: 335,528
[22] Filed: Dec. 29, 1981
[51] Int. Cl.³ .............................................. H02G 3/06
[52] U.S. Cl. .................................... 174/65 R; 174/51; 285/162
[58] Field of Search .................. 174/65 R, 55, 51, 78; 285/158, 161, 162

[56] References Cited

U.S. PATENT DOCUMENTS

| | | | |
|---|---|---|---|
| 2,744,769 | 5/1956 | Roeder et al. | 285/158 |
| 3,183,297 | 5/1965 | Curtiss | 174/65 |
| 3,193,613 | 7/1965 | Van Buren, Jr. | 174/65 |
| 3,260,790 | 7/1966 | Alsup | 174/51 |
| 3,349,946 | 10/1967 | Lee | 220/3.2 |
| 3,603,912 | 9/1971 | Kelly | 339/89 |
| 3,647,934 | 3/1972 | Hurtt | 174/65 |
| 3,791,680 | 2/1974 | Cleare | 174/78 X |
| 3,858,151 | 12/1974 | Paskert | 339/14 R |
| 4,000,918 | 1/1977 | Reker | 285/161 X |
| 4,021,604 | 5/1977 | Dola et al. | 174/51 |
| 4,198,537 | 4/1980 | Mariani | 174/65 R |

Primary Examiner—J. V. Truhe
Assistant Examiner—D. A. Tone
Attorney, Agent, or Firm—Robert M. Rodrick; Salvatore J. Abbruzzese

[57] ABSTRACT

A snap-on liquid-tight connector for mechanically and electrically connecting a flexible metallic conduit to an electrical enclosure. The connector is screw-threaded at the conduit receiving end for electrical contact thereto and for secure, liquid-tight engagement. The opposite end of the connector is snapped into the knock-out of an electrical enclosure. The insertion end of the connector provides both electrical and mechanical connection between the connector and the electrical enclosure.

6 Claims, 3 Drawing Figures

SNAP-ON LIQUID TIGHT CONNECTOR FOR FLEXIBLE METAL CONDUIT

FIELD OF THE INVENTION

This invention relates to connectors for connecting flexible conduit to an electrical junction box and more particularly relates to a connector which is liquid-tight and can snap onto the junction box.

BACKGROUND OF THE INVENTION

In connecting conduit containing electrical cables to a junction box, a connector is employed which not only mechanically connects the conduit to the box but also desirably provides electrical connection, i.e., ground connection therebetween. When employing a metallic raceway or flexible metallic conduit, the ground connection is usually made between the metallic conduit itself and the junction box.

In order to provide a suitable liquid-tight connection, a connector is commonly employed that includes a metallic grounding ring to electrically connect the metal cable to the box, and a resilient sealing ring which provides the liquid-tight seal between the connector and the box. The body of the structure is usually screw-threaded for screw-tight attachment to the box.

A gland nut is employed to urge the sealing ring against the enclosure for a liquid-tight seal. A lock nut is then used to secure the combination. Once the sealing ring is compressed as by screw tightening the gland nut, it usually will not sufficiently recover so as to be reusable for further connections. Further, a multi-piece unit of this type is costly, both to manufacture and securely install in the junction box. The connector would also be subject to being shaken loose in response to vibratory forces. Additionally, individual components of these multi-piece units can be lost or destroyed, rendering the entire unit useless.

It is thereby desirable to have a connector which will result in more efficient connection and a product which is less costly to manufacture and install than is presently available.

SUMMARY OF THE INVENTION

It is an object of the present invention to provide improved metallic conduit connectors.

It is a more particular object of the invention to provide an improved liquid-tight connector for metallic conduits which resiliently mounts onto an electrical enclosure for secure mechanical and electrical connection.

In the attainment of the foregoing and other objects, the invention looks toward providing a connector which receives the end of a flexible metallic conduit in light-tight relation. The connector then can be resiliently secured to an electrical enclosure, providing mechanical and electrical connection. The invention further looks to providing a housing body which couples in liquid-tight relation with the metalic conduit and further coupled with the electrical enclosure.

In a particularly described embodiment a unitary body is employed, having an opening which connects with a metallic conduit in liquid-tight relation. The body contains a metallic grounding ferrule which electrically connects to the metallic conduit. The body then extends to connect with the junction body by employing integral snap members which engage the inside wall of the electrical enclosure. The grounding ferrule similarly extends to make electrical connection with the electrical enclosure.

An alternate embodiment includes a grounding ferrule having resilient clips which, in addition to electrically connecting the connector, also mechanically affixes the connector to the electrical enclosure.

Other objects and features of the invention will be evident from the following detailed description of preferred embodiments and from the drawings herein.

DETAILED DESCRIPTION OF THE PREFERRED EMBODIMENTS

Figure 1:
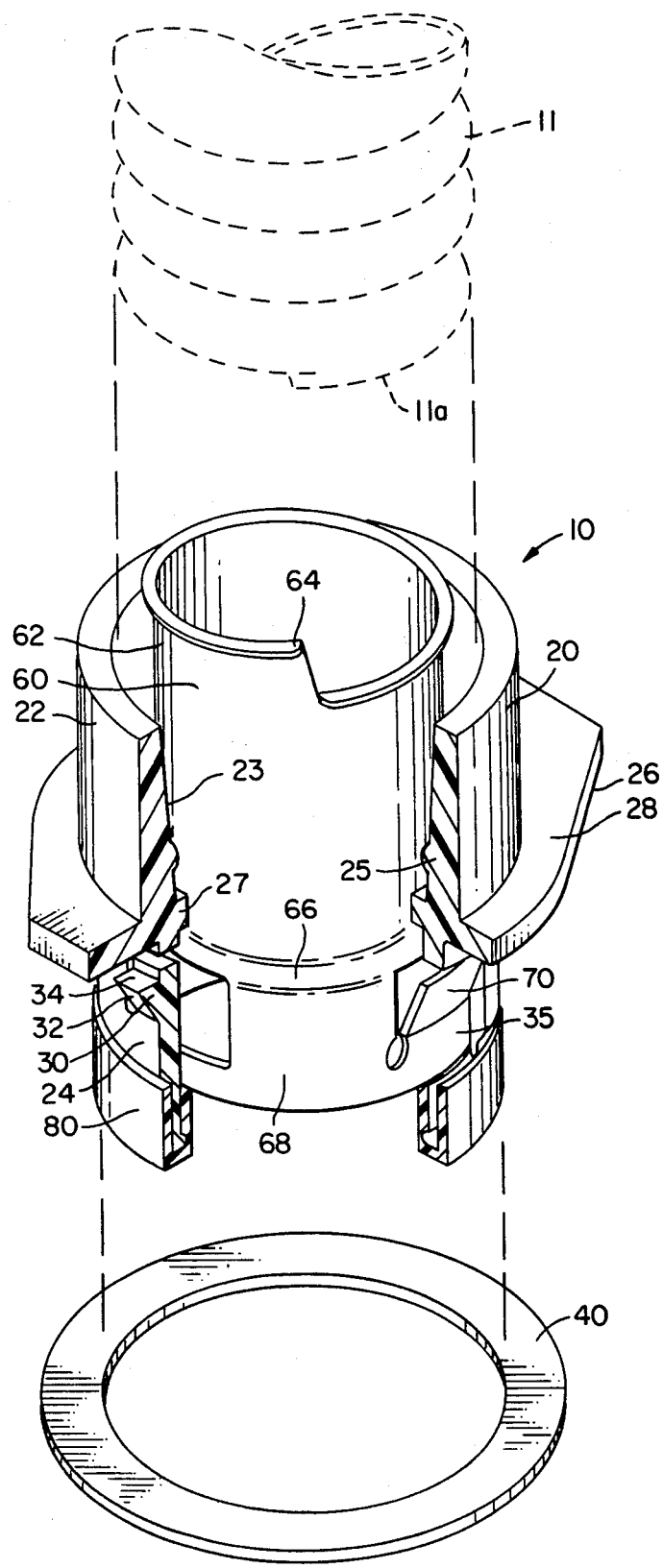
FIG. 1 is a perspective showing, partially in section of the snap-on liquid-tight connector of the present invention, with the flexible conduit shown in phantom.
Figure 2:
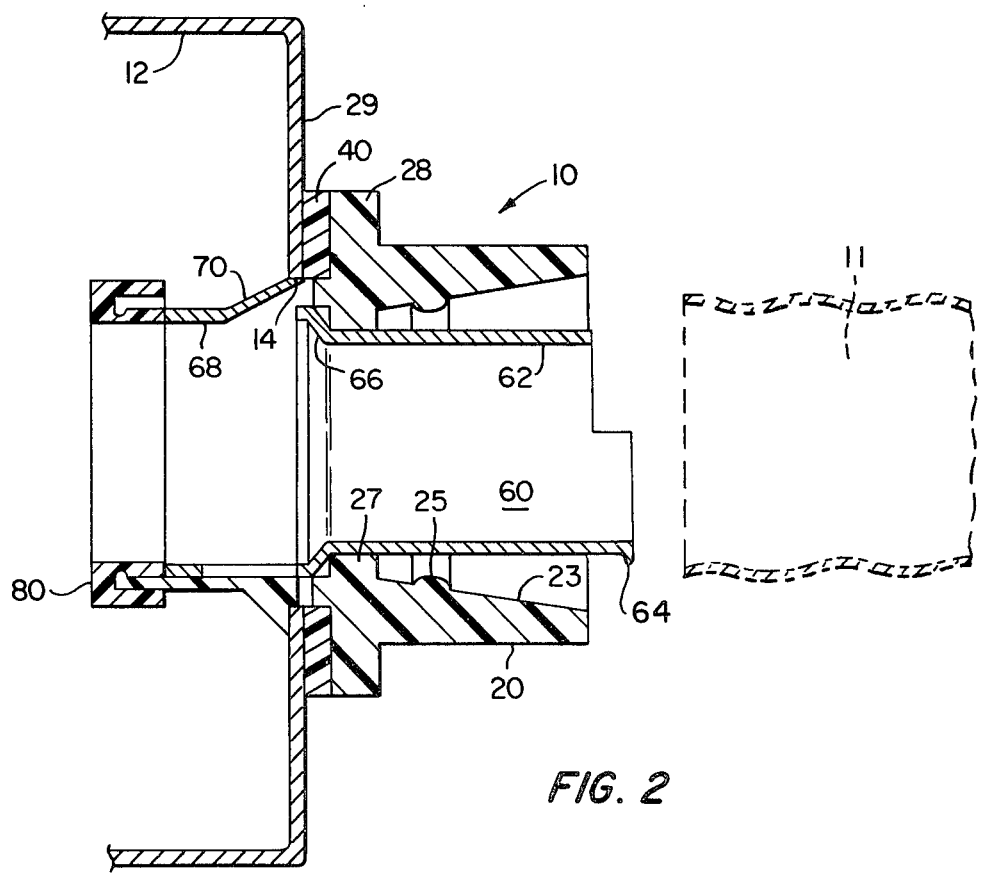
FIG. 2 is a longitudinal cross-section of the connector of FIG. 1 as attached to a junction box.

Referring to FIGS. 1 and 2, the connector 10 of the present invention includes an outer housing 20, sealing washer 40, grounding ferrule 60 and may also include an insulated throat 80.

Housing 20 has a generally hollow cylindrical shape, having a conduit receiving section 22 and an insertion section 24 divided transversly by annular shoulder 26 which extends both radially outwardly and inwardly of housing 20. In preferred form, housing 10 is a unitary member formed of plastic or similar material, though it is contemplated that any rigid material, including metal, may be employed.

Conduit receiving section 22 is adapted to connect with flexible metal conduit 11 (shown in phantom) in liquid tight relation. The internal wall 23 of receiving section 22 is tapered so that the internal diameter of section 22 is greater at its distal outer extent than at its inner extent. An annular rib 25 protrudes from and circumscribes the internal wall 23 of receiving section 22 to further constrict the internal diameter. The metallic conduit 11 inserted therein will wedge against the narrower inner portion of internal wall 23 thereby forming a liquid-tight seal therebetween in assembly. The annular rib 25 will bear inwardly against conduit 11 constricting its edge to secure the conduit in sealed position in receiving section 22. Annular rib 25 prevents gathering of an outer jacket (not shown) which may surround the metallic conduit and further provides prevention of inadvertent pull out.

Shoulder 26 lies in a plane which transversly cuts the cylinder of housing 20, and has an outwardly projecting extent 28 extending adjacent to the electrical enclosure 12, as shown in FIG. 2. Resilient sealing washer 40 is disposed between the inner wall of shoulder extent 28 and the outer wall 29 of the electrical enclosure 12 to insure a secure connection.

Insertion section 24 of housing 20 is adapted to be inserted into an opening or knock-out of the electrical enclosure 12, having a smaller outer diameter that conduit receiving section 22. Extending from the outer surface of insertion section 24 are a series of spaced apart resilient locking tabs 30 which serve to secure the housing to the electrical enclosure. Locking tabs 30 have tapered side walls 32 and flat land portions 34 which are parallel to the wall of shoulder extent 28.

Locking tabs 30 are disposed so as to snap into and engage the inside surface of wall 29 of the electrical enclosure adjacent the knock-out upon insertion of the insertion end 24 of housing 20. The distance between flat lands 34 and the inside wall of shoulder extent 28 is such that sealing washer 40 will be compressed in assembly, forming thereby a liquid-tight connection.

A series of slots 35 are located at spaced apart positions on the outside of insertion portion 24. The slots 35 accommodate outwardly extending grounding tabs 70 on the grounding ferrule 60 to permit contact with the wall of the electrical enclosure as will be described hereinafter.

Electrical connection between metal conduit 11 and the enclosure 12 is provided by metallic grounding ferrule 60 which is slidably inserted through the insertion end of housing 20. Grounding ferrule 60 has a cylindrical conduit contacting section 62 having a helically configured outer edge 64 which can be screw threaded into the inside wall of metallic conduit 11. This screw-type relation securely connects grounding ferrule 60 to conduit 11 and provides electrical contact therebetween.

A mid-section 66 of grounding ferrule 60 is frustoconical in shape, having a wide portion forming a stop which engages the inwardly extending section 27 of shoulder 26, thereby preventing axial displacement of the grounding ferrule 60.

Extending from the wider end of frustoconical midsection 66 is a cylindrical insertion end 68 of grounding ferrule 60. Insertion end 68 has a series of outwardly extending grounding tabs 70 which are disposed in registry with slots 35 of housing 20. Grounding tabs 70 extend out beyond the outer wall of housing 20 to contact, upon insertion, the inner peripheral wall 14 of the electrical enclosure 12, establishing electrical connection therebetween. As grounding tabs 70 are resiliently bendable, they may be force fitted into the knock-out of the electrical enclosure 12 wherein they provide a bias against the inner peripheral wall 14.

An insulated throat 80 which may surround the outer extent of insertion end 24 of housing 20, serves to buffer the edge of the housing. Throat 80 protects electrical cable (not shown) which extends through the connector from contacting the edge of the housing or the grounding ferrule.

Employing the connector of the present invention, connection can be made between flexible metallic conduit and an electrical enclosure in the following manner. Connector 10 can be screw-threaded onto the end of a flexible metallic conduit 11 using the screw-threaded outer edge 64 of grounding ferrule 60 to engage the inner metallic portion of the conduit 11 and tightened down until the outer edge 11a of the conduit wedges against the tapered inner wall 23 of the receiving section 22 below annular rib 25. This relation creates a liquid-tight seal between the housing 20 and the conduit and additionally anchors the conduit securely in the receiving section 22, preventing inadvertent pull out. This relation also establishes electrical connection between the conduit and the grounding ferrule 60. The insertion end 24 of housing 20 is then snapped into the knock-out of an electrical enclosure. Resilient locking tabs 30 bend inwardly upon insertion, then recover to snap on to the inside surface of the electrical enclosure 12, thus mechanically mounting the connection 10 to the enclosure. Grounding tabs 70, which extend outwardly from slots 35 of insertion end 24, preferably engage the peripheral wall 14 of the knock-out, thereby providing electrical contact thereto.

Figure 3:
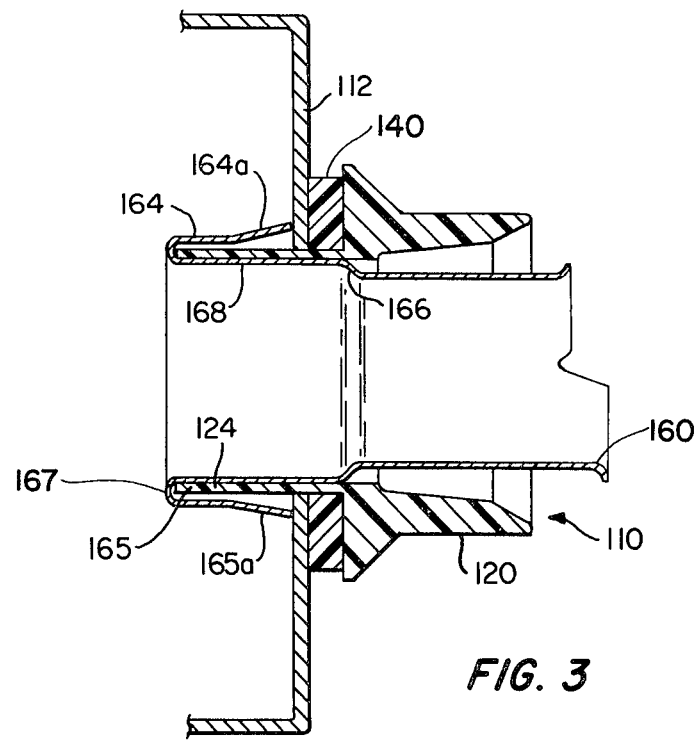
FIG. 3 is a longitudinal cross-section of an alternative embodiment of the present invention, having a mechanical and electrical grounding ferrule.

An alternative embodiment of the preferred invention is shown in FIG. 3. As the embodiment of FIG. 3 is substantially similar to that of FIGS. 1 and 2, similar reference numerals will be used to denote similar elements with 100 being added to the reference characters of FIGS. 1 and 2.

Connector 110, includes outer cylindrical housing 120, sealing washer 140 and grounding ferrule 160.

Grounding ferrule 160 and the insertion section 124 of housing 120 have been modified so that the grounding ferrule 160 provides both mechanical and electrical connection to the electrical enclosure 112. The insertion section 124 is a hollow cylinder, having no slots or locking tabs. Similarly, grounding ferrule 160 also has a hollow cylindrical insertion end 168 without grounding tabs.

In the present embodiment, grounding ferrule 160 includes a pair of peripherally spaced resilient clips 164 and 165, diametrically opposed and extending from the insertion edge 167 of grounding ferrule 160, circumferentially exteriorly of and back along the longitudinal extent of the grounding ferrule to a point just proximal of the frustoconical midsection 166. Thus, clips 164 and 165 form a pair of open-ended chambers at the insertion end of the grounding ferrule. The outer extents 164a and 165a of the respective clips, adjacent the frustoconical midsection 166 are flanged to incline outwardly for engagement with the inside wall of electrical enclosure 112.

In inserting the connector into the knock-out of the electrical enclosure 112, the resilient clips will bend inwardly, then recover to engage the inside surface of the electrical enclosure. This contact will not only provide electrical connection between the connector and the electrical enclosure, but will also provide mechanical securement therebetween.

The above embodiments, shown and described, connect an extent of flexible conduit to an electrical enclosure at a straight-on or perpendicular direction. However, it is contemplated that curved connectors, i.e., with 90 degree, 45 degree, etc. bends, constructed in accordance with the present invention, may be employed to connect conduit to electrical enclosures at other than straight-on positions.

Accordingly, the above-described embodiments are shown only by way of example and are in no sense limited to the particularly described features. The true spirit and scope of the invention are set forth in the claims appended hereto.

What is claimed is:

1. A connector for coupling a flexible metallic conduit to an electrical enclosure having an opening comprising:
    an elongate housing having a passage therethrough for receiving said conduit, said housing having a wall of inwardly decreasing internal dimension for engaging one end of said conduit therealong in liquid tight relation;
    an elongate grounding ferrule supported in said housing and having a first helical end for engaging the interior of said conduit and progressively drawing said conduit one end into said liquid-tight relation with said housing, said grounding ferrule including a plurality of integrally formed resilient grounding tabs adjacent the end of said ferrule opposite said helical end, for electrically engaging said electrical enclosure adjacent said opening; and means inclusive of said grounding tabs for resiliently securing said connector in said opening of said electrical enclosure.

2. The connector in accordance with claim 1 wherein said resiliently securing means includes a resilient member, outwardly extending from said connector for securely engaging said electrical enclosure.

3. The connector in accordance with claim 1 wherein said resilient member includes a locking tab having a land portion thereon for engaging a wall surface of said electrical enclosure adjacent said opening.

4. The connector in accordance with claim 1 wherein said resilient member includes a plurality of spaced-apart locking tabs, each having land portions thereon for engaging the wall surface of said electrical enclosure adjacent said opening.

5. The connector in accordance with claim 1 wherein said grounding member includes a plurality of resilient spaced-apart clips, said clips including flanged portions thereon for engaging a wall surface of said electrical enclosure adjacent said opening.

6. The connector in accordance with claim 1 wherein said wall of said housing includes an inwardly extending rib for securely engaging said conduit.

* * * * *